US010652103B2

(12) United States Patent
Anderson et al.

(10) Patent No.: US 10,652,103 B2
(45) Date of Patent: May 12, 2020

(54) SYSTEM AND METHOD FOR HANDLING EVENTS INVOLVING COMPUTING SYSTEMS AND NETWORKS USING FABRIC MONITORING SYSTEM

(71) Applicant: Goldman, Sachs & Co., New York, NY (US)

(72) Inventors: Robert Anderson, Chatham, NJ (US); Ilia Berman, Brooklyn, NY (US); Keith Billis, Franklin Lakes, NJ (US); Amol Joshi, Robbinsville, NJ (US)

(73) Assignee: Goldman Sachs & Co. LLC, New York, NY (US)

( * ) Notice: Subject to any disclaimer, the term of this patent is extended or adjusted under 35 U.S.C. 154(b) by 179 days.

(21) Appl. No.: 15/134,277

(22) Filed: Apr. 20, 2016

(65) Prior Publication Data

US 2016/0315822 A1    Oct. 27, 2016

Related U.S. Application Data

(60) Provisional application No. 62/152,211, filed on Apr. 24, 2015.

(51) Int. Cl.
*H04L 12/24* (2006.01)
*G06Q 10/06* (2012.01)

(52) U.S. Cl.
CPC ........ *H04L 41/145* (2013.01); *H04L 41/0893* (2013.01); *H04L 41/5074* (2013.01);
(Continued)

(58) Field of Classification Search
CPC . H04L 41/50; H04L 41/0604; H04L 41/0613; H04L 41/069; H04L 41/0893; H04L 67/22; H04L 67/24; H04L 63/1416; G06F 11/0781; G06F 21/552; G06F 17/30598
See application file for complete search history.

(56) References Cited

U.S. PATENT DOCUMENTS 7,103,504 B1 * 9/2006 McGlaughlin ...... G06F 11/0709
702/182
7,464,046 B2 * 12/2008 Wilson ................... G06Q 10/06
705/7.15

(Continued)

OTHER PUBLICATIONS

European Patent Office, "Supplementary European Search Report," Application No. EP16783827.5, dated Nov. 7, 2018, 9 pages.

(Continued)

*Primary Examiner* — Barbara B Anyan

(57) ABSTRACT

A method includes receiving, at a fabric monitoring system, information identifying occurrences of events in an enterprise system having multiple computing or networking systems. The events occur on or involve computing or networking devices in the computing or networking systems, and the events are identified using rules accessible by the fabric monitoring system. The method also includes processing, using the fabric monitoring system, the information in real-time to identify the occurrences of the events and to assign the events to multiple situations. The events are assigned to the situations using one or more processing models accessible by the fabric monitoring system. The method further includes outputting information identifying the situations.

22 Claims, 8 Drawing Sheets

(52) U.S. Cl.
CPC ......... *G06Q 10/06* (2013.01); *G06Q 10/0633* (2013.01); *G06Q 10/0635* (2013.01)

(56) References Cited

U.S. PATENT DOCUMENTS

| | | | |
|---|---|---|---|
| 7,503,045 B1 | 3/2009 | Aziz et al. | |
| 7,954,004 B2 | 5/2011 | Li | |
| 8,195,797 B2 | 6/2012 | Sullivan | |
| 8,230,386 B2 | 7/2012 | Sedukhin et al. | |
| 9,798,883 B1* | 10/2017 | Gil | G06F 21/577 |
| 2002/0184067 A1* | 12/2002 | McLean | G06Q 10/0637 705/7.39 |
| 2006/0047742 A1* | 3/2006 | O'Neill | H04L 49/25 709/203 |
| 2006/0212486 A1* | 9/2006 | Kennis | G06F 21/55 |
| 2006/0248283 A1* | 11/2006 | Galchev | G06F 9/5033 711/141 |
| 2007/0100724 A1* | 5/2007 | Hollas | G06Q 10/0635 705/36 R |
| 2008/0294771 A1* | 11/2008 | Hermes | G05B 23/0267 709/224 |
| 2010/0100778 A1* | 4/2010 | Sullivan | H04L 12/00 714/57 |
| 2010/0229150 A1* | 9/2010 | Stone | G06F 8/00 717/104 |
| 2011/0238430 A1* | 9/2011 | Sikorski | G06Q 10/10 705/1.1 |
| 2012/0047249 A1* | 2/2012 | Bharadwaj | H04L 49/357 709/224 |
| 2012/0060163 A1* | 3/2012 | Khan | H04L 63/105 718/103 |
| 2012/0137367 A1* | 5/2012 | Dupont | G06F 21/00 726/25 |
| 2012/0144251 A1* | 6/2012 | Carey | G06F 11/0709 714/57 |
| 2012/0158650 A1 | 6/2012 | Andre et al. | |
| 2013/0298244 A1 | 11/2013 | Kumar et al. | |
| 2014/0173060 A1 | 6/2014 | Jubran et al. | |
| 2014/0223555 A1* | 8/2014 | Sanz Hernando | G06F 21/55 726/22 |
| 2014/0310287 A1 | 10/2014 | Bruso et al. | |
| 2014/0330616 A1* | 11/2014 | Lyras | G06Q 10/0635 705/7.28 |
| 2015/0286969 A1* | 10/2015 | Warner | G06Q 10/0633 705/7.27 |
| 2015/0372855 A1* | 12/2015 | Kushmerick | H04L 41/0613 709/224 |

OTHER PUBLICATIONS

International Search Report dated Jul. 28, 2016 in connection with International Application No. PCT/US16/28576, 2 pages.
Written Opinion of the International Searching Authority dated Jul. 28, 2016 in connection with International Application No. PCT/US16/28576, 6 pages.
Techopedia, "Fabric Computing", http://web.archive.org/web/20140404055144/http://www.techopedia.com, 2014, 1 page.
Wikipedia, "Fabric Computing", http://en.wikipedia.org/wiki/Fabric_computing, May 28, 2014, 3 pages.

* cited by examiner

SYSTEM AND METHOD FOR HANDLING EVENTS INVOLVING COMPUTING SYSTEMS AND NETWORKS USING FABRIC MONITORING SYSTEM

CROSS-REFERENCE TO RELATED APPLICATION AND PRIORITY CLAIM

This application claims priority under 35 U.S.C. § 119(e) to U.S. Provisional Patent Application No. 62/152,211 filed on Apr. 24, 2015, which is hereby incorporated by reference in its entirety.

TECHNICAL FIELD

This disclosure relates generally to computing systems. More specifically, this disclosure relates to a system and method for handling events involving computing systems and networks using a fabric monitoring system.

BACKGROUND

Businesses, governments, and other organizations often have an extremely large number of computing and networking devices distributed across a wide range of geographic areas. For example, a large multi-national corporation could have multiple data centers each with tens of thousands of computing and networking devices, as well as various offices around the world ranging from a few computing or networking devices to many thousands of computing or networking devices. Each computing or networking device denotes a source of possible anomalies or other events that need to be tracked, investigated, and resolved if necessary. However, as the size of an organization grows along with its computing systems and networks, handling these events can consume increasingly more and more time and resources of the organization.

SUMMARY

This disclosure provides a system and method for handling events involving computing systems and networks using a fabric monitoring system.

In a first embodiment, a method includes receiving, at a fabric monitoring system, information identifying occurrences of events in an enterprise system having multiple computing or networking systems. The events occur on or involve computing or networking devices in the computing or networking systems, and the events are identified using rules accessible by the fabric monitoring system. The method also includes processing, using the fabric monitoring system, the information in real-time to identify the occurrences of the events and to assign the events to multiple situations. The events are assigned to the situations using one or more processing models accessible by the fabric monitoring system. The method further includes outputting information identifying the situations.

In a second embodiment, a system includes a fabric monitoring system having multiple computing nodes and multiple communication links coupling the computing nodes. The fabric monitoring system is configured to receive information identifying occurrences of events in an enterprise system having multiple computing or networking systems. The events occur on or involve computing or networking devices in the computing or networking systems, and the events are identified using rules accessible by the fabric monitoring system. The fabric monitoring system is also configured to process the information in real-time to identify the occurrences of the events and to assign the events to multiple situations. The events are assigned to the situations using one or more processing models accessible by the fabric monitoring system. The fabric monitoring system is further configured to output information identifying the situations.

In a third embodiment, a non-transitory computer readable medium contains computer readable program code that, when executed by computing nodes of a fabric monitoring system, cause the computing nodes to receive information identifying occurrences of events in an enterprise system having multiple computing or networking systems. The events occur on or involve computing or networking devices in the computing or networking systems, and the events are identified using rules accessible by the fabric monitoring system. The computer readable program code, when executed by the computing nodes of the fabric monitoring system, also causes the computing nodes to process the information in real-time to identify the occurrences of the events and to assign the events to multiple situations. The events are assigned to the situations using one or more processing models accessible by the fabric monitoring system. The computer readable program code, when executed by the computing nodes of the fabric monitoring system, further causes the computing nodes to output information identifying the situations.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 8, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
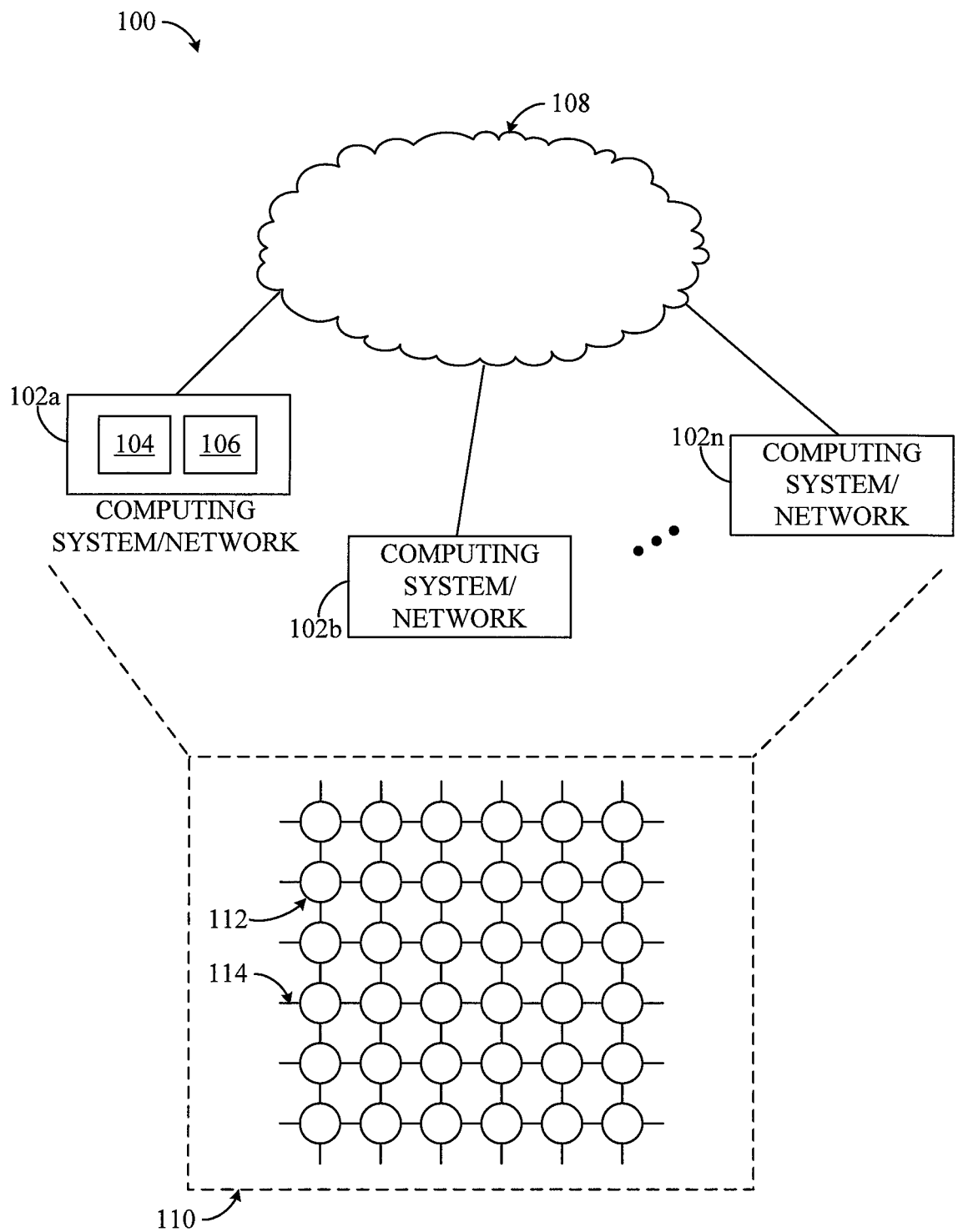
FIG. 1 illustrates an example system for handling events involving computing systems and networks using a fabric monitoring system according to this disclosure.

FIG. 1 illustrates an example system 100 for handling events involving computing systems and networks using a fabric monitoring system according to this disclosure. As shown in FIG. 1, the system 100 includes or is associated with one or more computing systems or networks 102a-

102*n*. Each computing system or network 102*a*-102*n* denotes a collection of computing devices 104 and/or networking devices 106. Each computing system or network 102*a*-102*n* could include any number of devices 104 and/or 106. As noted above, a computing system or network 102*a*-102*n* could range from systems or networks with only a handful of devices 104 and/or 106 up to systems or networks with tens of thousands of devices 104 and/or 106 (or even more). Multiple computing systems or networks 102*a*-102*n* can be used within a single common geographic area or across multiple geographic areas, including areas separated by very long distances.

One or more devices in each of the computing systems or networks 102*a*-102*n* can communicate over at least one network 108. The network 108 denotes any suitable network or combination of networks at one or more locations. The network 108 could, for example, include one or more local area networks (LANs), wide area networks (WANs), metropolitan area networks (MANS), or a regional or global network. A collection of computing systems or networks 102*a*-102*n* and related network(s) 108 can be referred to as an "enterprise system" in this patent document.

A fabric monitoring system 110 is implemented within the enterprise system, such as by using various ones of the computing devices 104 and networking devices 106 in the computing systems or networks 102*a*-102*n*. Fabric computing (also referred to as unified computing, unified fabric, data center fabric, and unified data center fabric) involves the creation of a computing fabric formed by computing nodes 112 that are interconnected using communication links 114. The exact layout of the computing nodes 112 and the network connectivity topology defined by the communication links 114 can vary from that shown here as needed or desired. A fabric monitoring system 110 routinely includes a consolidated high-performance computing system including loosely coupled storage, networking, and parallel processing functions linked by high-bandwidth interconnects (such as 10 gigabit Ethernet and InfiniBand connections). In some embodiments, the interconnected nodes appear to perform as a single logical unit.

The fundamental components of the fabric monitoring system 110 are its nodes 112 and it links 114. The nodes 112 generally include hardware components such as processors, memories, and peripheral devices. The links 114 are functional connections between the nodes 112. A fabric monitoring system 110 can be distinguished from other architectures for several reasons. For example, a fabric monitoring system 110 can be deployed in multiple "stripes" and provide support for cross-stripe communications and signaling. This provides for improved scalability and resiliency of the fabric monitoring system 110. Also, a fabric monitoring system 110 could support multiple types of processing models (such as user-defined and analytical models), which supports multiple mechanisms for identifying and classifying events associated with the computing systems or networks 102*a*-102*n*.

As described in more detail below, the fabric monitoring system 110 can be used advantageously in monitoring, diagnosing, and maintaining enterprise applications deployed in the computing systems or networks 102*a*-102*n*, as well as other aspects of the computing systems or networks 102*a*-102*n*. Enterprise applications denote applications deployed on multiple devices 104 and/or 106 in one or more locations and that provide event-related information to the fabric monitoring system 110. While conventional monitoring systems often provide alerts for individual anomalies or system failures, these monitoring systems typically fail to provide an integrated approach to properly categorize and process system and application events across a large enterprise system. The fabric monitoring system 110 can provide such an integrated approach to properly categorize and process system and application events for use in various environments, including large enterprise systems.

Among other things, this allows the fabric monitoring system 110 to provide organization-level diagnostics and maintenance. For example, the fabric monitoring system 110 can be used as described below to provide a complete situation management lifecycle for events, from occurrence or inception of the events to their (possibly automated) resolution. The fabric monitoring system 110 can also provide for the processing of events based on analytics and machine learning instead of or in addition to static rules. In addition, the fabric monitoring system 110 can provide a highly scalable platform for infrastructure and application metrics collection, with rapid incident resolution based on predictive analytics. This may allow the fabric monitoring system 110 to be used for more predictive functions related to event processing, rather than merely reacting to events that have occurred.

Events that are identified and processed by the fabric monitoring system 110 denote bits of information and can originate from any suitable sources within the computing systems or networks 102*a*-102*n*. For example, the events could denote a current state or a change in the current state of a device, system, or network (or a portion therefore). Events can also be used to identify anomalies or occurrences of defined conditions within the computing systems or networks 102*a*-102*n*. Examples of specific types of events could include the current central processing unit (CPU) utilization of a computer executing an application, an identification of a fault on a computer executing an application, or a faulty connection identified by an application. As described below, rules used by the fabric monitoring system 110 help to identify events of interest in real-time, and the events are then used to identify situations to be investigated or resolved (either manually or in an automated manner).

Situations are derived from steams of events and can be identified using various processing models, which define how the fabric monitoring system 110 processes the events to identify the situations. For example, a processing model could indicate that a situation is to be created for each event. As another example, a processing model could indicate that a situation is to be created when a specified number or type(s) of events related to a single asset or a group of assets occur(s) within a defined time period. An asset generally denotes some hardware, software, firmware, or combination therefore. Examples of assets could include specific hardware (such as switches or host computers), specific applications, or other virtual/physical compute platforms. Libraries of processing models and baseline policies may be created and stored within the fabric monitoring system 110, and these models and policies can be directly applicable to the domain of the infrastructure or application event monitoring.

Each identified situation can be translated and communicated across a system for further action. For example, a situation can be given a ticket number and routed to system maintenance or operational intelligence platform for corrective action, or a situation may be identified as relating to an automated reporting and corrective function within an enterprise application.

In this manner, entire enterprise systems can be monitored and maintained using the fabric monitoring system 110, with reporting and recordation at a specific event level. Event processing, including categorization, reporting, and corrective and/or predictive action, can be based on analytics and machine learning techniques instead of or in addition to static rules and filters. As such, event monitoring that utilizes the fabric monitoring system 110 across enterprise systems presents a highly-scalable unified platform for infrastructure and application metrics collection and provides for rapid incident resolution based on predictive analytics.

The fabric monitoring system 110 can also operate to help ensure that event starvation is mitigated. Event starvation can occur when excessive numbers of events are generated, such as due to a faulty application or device or due to an intentional denial or service (DOS) attack, distributed DOS (DDOS) attack, or other attack. An excessive number of events can overload a conventional system, causing the system to stop providing events to downstream components (who are therefore "starved" of events). In some embodiments, the fabric monitoring system 110 addresses issues relating to event starvation by allowing the abstraction of components.

The fabric monitoring system 110 can further provide for messaging and persistence, as well as for the use of reference data during event routing, situation detection, and event enrichment. For example, in some embodiments, a detailed history of processing for each event can be stored in a persistent storage as each event is processed through the fabric monitoring system 110. The event histories may be queried and searched, such as by using a query or search function.

In addition, protocols and functionality relating to event subscriptions allow the fabric monitoring system 110 to support preemptive awareness of events and situations within an enterprise system and enterprise applications within the enterprise system, which often depend on an underlying low level of infrastructure components. For example, the fabric monitoring system 110 could support subscription of events so that a derived situation can be created from the events occurring in separate or different areas of an organization's infrastructure.

In some embodiments, users may configure the policies and rules that are used to specify how events are categorized and escalated. Two example mechanisms for configuring event management polices include (i) pre-defined selections for standardized specifications and (ii) a Domain Specific Language (DSL) for describing specialized specifications. The DSL could allow, for example, events to be given the same name or other identifier or to be sent to a grouping model, which can be selected based on schedule or behavioral analytics.

The fabric monitoring system 110 also supports various processing models for event grouping and situation identification. Two example types of models include user-defined grouping models and discovered or analytical grouping models. Multiple processing models could be used or supported, and additional processing models can be created as needed or desired to define different grouping patterns. User-defined grouping models are defined by one or more users, and examples of user-defined grouping models could include "One for One," "X over Y," and "Battery Failure." Analytical models are defined as models supporting one or more analytical functions, and examples of analytical models could include grouping by event similarity or grouping by event anomalies (such as uncategorized events, new or never before seen events, event volume irregularities, absence of anticipated events, unregistered events, and others).

In some embodiments, the event categorization can be stateless and can be distributed over however many nodes 112 are required or available to process the load. A messaging system within the fabric monitoring system 110 could be used to distribute events to available processing nodes 112. The messaging system may implement or utilize a "group key" or other indicator to ensure that any event that is part of the same group will be delivered to the same processing node 112. Groups could be defined in any suitable manner, such as by grouping events associated with a single asset or collection of assets. The messaging system and certain persistence mechanisms could also be "pluggable," which facilitates less costly implementations of various mechanisms for quality assurance and development of additional functionalities within the fabric system. The state needed for model evaluation could be cached in process instances, the messaging system could deliver events to the nodes 112 or locations where information is cached, and continuity can be achieved such as by a drop copy of changes to the state to an off-machine persistence store.

As noted above, the fabric monitoring system 110 could include built-in support for striped processing flow, which can help to enable the platform's isolation and mitigate risks related to event starvations. With striping, different nodes 112 or even different instances of the fabric monitoring system 110 itself can be used to process events from different sources, such as events from different assets, different regions, or different deployments of hardware/software/firmware. Other partitions to support striping could also be used, such as by dividing an enterprise system by business unit or by type of business being transacted using the computing systems or networks 102a-102n. One challenge with striping involves how to communicate an event or a situation in one stripe to other stripes that need to know of such event or situation. In some embodiments, this can be done by creating synthetic events upon the creation of situations in one stripe. These synthetic events can then be distributed to other stripes to allow for cross-stripe correlations of the events or situations.

Depending on the implementation, the fabric monitoring system 110 provides intelligent monitoring and notification of situations requiring action, including notification to system administrators, user groups, or subscribers. Also, a situation can be a single event on an enterprise system or multiple events correlated to provide deep insight into an anomaly within the enterprise system. Further, the fabric monitoring system 110 can reduce operational and regulatory risks by delivering transparency and intelligent management of large-scale enterprise technology environment events. The fabric monitoring system 110 also delivers a workflow for users to specify how events are categorized (such as by priority, group, situation, or user-defined category), reported, and recorded and how subsequent actions are assigned and executed. The fabric monitoring system 110 further allows event grouping policies to be subject to controlled testing and promotion lifecycles, thereby reducing exposure related to unwanted changes or unnecessary processing in production environments. In addition, the fabric monitoring system 110 can support enforcement of controlled lifecycles for policies and rules due to the separation of users who can create rules and users who can promote those rules to production or use.

Additional details regarding the fabric monitoring system 110 are provided below. Note that the fabric monitoring system 110 could include any number of nodes 112 and communication links 114 in any suitable arrangement. While shown as residing outside of the computing systems or networks 102a-102n, the fabric monitoring system 110 could be formed or reside within one or more of the computing systems or networks 102a-102n.

Although FIG. 1 illustrates one example of a system 100 for handling events involving computing systems and networks using a fabric monitoring system 110, various changes may be made to FIG. 1. For example, the system 100 could include any number of computing systems or networks (each with any number of computing or networking devices), networks, and fabric monitoring systems. Also, systems and networks involving computers are highly configurable, and FIG. 1 does not limit this disclosure to any specific configuration of system or network.

Figure 2:
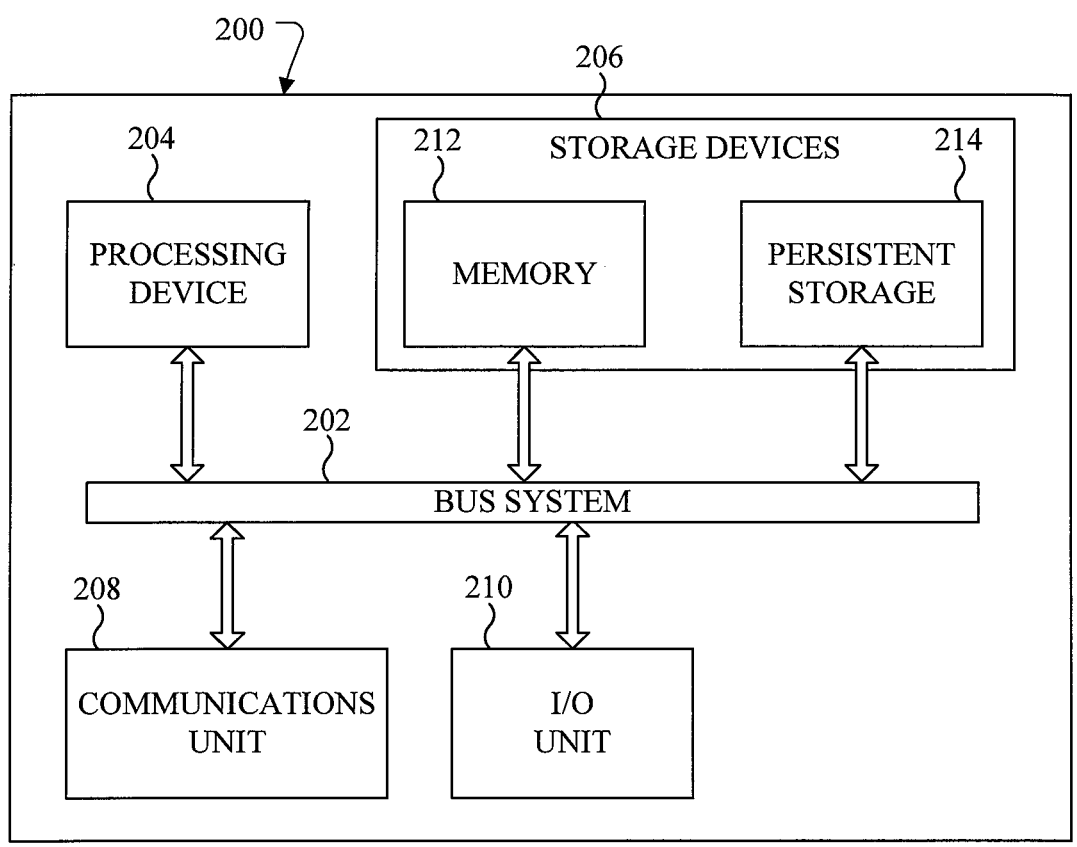
FIG. 2 illustrates an example computing device associated with a system for handling events involving computing systems and networks using a fabric monitoring system according to this disclosure.

FIG. 2 illustrates an example computing device 200 associated with a system for handling events involving computing systems and networks using a fabric monitoring system according to this disclosure. In particular, FIG. 2 illustrates an example implementation of the computing nodes 112 in the fabric monitoring system 110 of FIG. 1.

As shown in FIG. 2, the computing device 200 includes a bus system 202, which supports communication between at least one processing device 204, at least one storage device 206, at least one communications unit 208, and at least one input/output (I/O) unit 210. The processing device 204 executes instructions that may be loaded into a memory 212. The processing device 204 may include any suitable number(s) and type(s) of processors or other devices in any suitable arrangement. Example types of processing devices 204 include microprocessors, microcontrollers, digital signal processors, field programmable gate arrays, application specific integrated circuits, and discrete circuitry.

The memory 212 and a persistent storage 214 are examples of storage devices 206, which represent any structure(s) capable of storing and facilitating retrieval of information (such as data, program code, and/or other suitable information on a temporary or permanent basis). The memory 212 may represent a random access memory or any other suitable volatile or non-volatile storage device(s). The persistent storage 214 may contain one or more components or devices supporting longer-term storage of data, such as a read only memory, hard drive, Flash memory, or optical disc.

The communications unit 208 supports communications with other systems or devices. For example, the communications unit 208 could include a network interface card or a wireless transceiver facilitating communications with other nodes 112 over one or more communication links 114. The communications unit 208 may support communications through any suitable physical or wireless communication link(s).

The I/O unit 210 allows for input and output of data. For example, the I/O unit 210 may provide a connection for input and output of data to a local external memory, database, or peripheral device.

Although FIG. 2 illustrates one example of a computing device 200 associated with a system for handling events involving computing systems and networks using a fabric monitoring system, various changes may be made to FIG. 2. For example, computing devices are highly configurable, and FIG. 2 does not limit this disclosure to any specific configuration of computing device.

Figure 3:
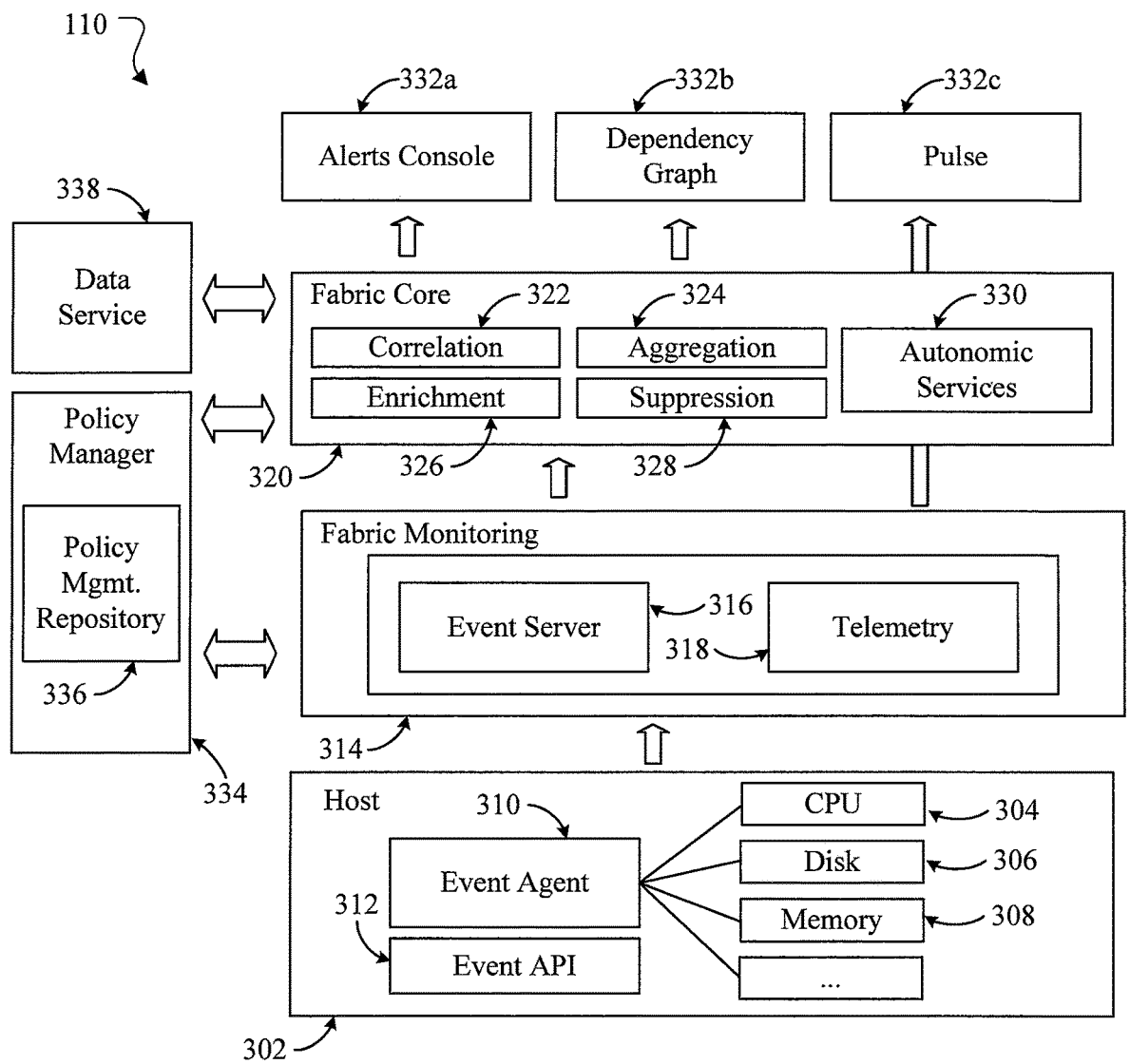
FIGS. 3 through 6 illustrate an example fabric monitoring system for handling events involving computing systems and networks and related details according to this disclosure.

FIGS. 3 through 6 illustrate an example fabric monitoring system 110 for handling events involving computing systems and networks and related details according to this disclosure. As shown in FIG. 3, the fabric monitoring system 110 is operating in conjunction with a host 302, which could denote any of the computing devices 104 or networking devices 106 in FIG. 1. The host 302 here includes various hardware components, such as one or more processors 304, one or more hard disks 306, and one or more memories 308. The processors 304 could (among other things) be used to execute one or more enterprise applications or other applications. Of course, host devices can come in a wide variety of configurations, which may include other or additional hardware components. Note that while one host 302 is shown in FIG. 3, the fabric monitoring system 110 can be used with any number of hosts or other sources of events.

The host 302 includes an event agent 310 and an event application programming interface (API) 312. The event agent 310 collects the events that are generated by the host 302 and provides the events to the fabric monitoring system 110 via the event API 312. The event agent 310 includes any suitable logic for collecting events, and the event API 312 includes any suitable interface for interacting with the event agent 310. The event agent 310 could, for instance, denote one or more applications executed by the processor 304.

The fabric monitoring system 110 includes a monitoring platform 314, which operates to collect events from the host 302 and other event sources. Among other things, the detected events can identify aspects of a computing or networking environment that are not working as expected or that satisfy user-defined or other monitoring rules. In this example, the monitoring platform 314 includes an event server 314 and a telemetry module 316. The event server 314 collects events from the event agent 310 in the host 302 and from other event agents in other hosts or event sources. The telemetry module 316 analyzes the detected events or other information in order to provide metrics for trouble-shooting, capacity planning, or other functions. The information from the telemetry module 316 could, for instance, contribute at least partially to the prevention of event starvation. The event server 314 includes any suitable logic for collecting events from event agents. In some embodiments, the event agent 310 and the event server 314 could denote information technology (IT) monitoring tools, such as those available from NAGIOS ENTERPRISES. The telemetry module 316 includes any suitable logic for identifying one or more metrics associated with incoming events.

The fabric monitoring system 110 also includes a core platform 320, which analyzes the events obtained by the monitoring platform 314 in order to identify situations that are arising, have arisen, or might arise in one or more of the computing systems or networks 102a-102n. In this example, the core platform 320 supports a correlation function 322, which can be used to identify events that are related and that may therefore form part of one or more situations. The core platform 320 also supports an aggregation function 324, which can be used to group related events for further processing. The core platform 320 further supports an enrichment function 326, which can be used to provide additional information about events or groups of events. The information provided by the enrichment function 326 could, in some instances, be used by the aggregation function 324 to group related events. The core platform 320 also supports a suppression function 328, which could be used to suppress certain events so that those events are not used to create situations (such as for events known to not be of interest). In addition, the core platform 320 supports one or more autonomic services 330, which could denote services that occur automatically in response to changing conditions. For instance, the autonomic services 330 could support self-healing, self-configuring, self-optimizing, or self-protecting functions that modify the fabric monitoring system 110 or the computing systems or networks 102a-102n in response to detected situations.

Although not shown, the fabric monitoring system 110 or the core platform 320 could support other functions. For example, one or more analytics functions could be used to analyze events in order to estimate the health of applications and their dependencies within the computing systems or networks 102a-102n. As another example, one or more reporting functions could be used to provide a historical view of events, agent health, and system-collected data. In this example, reports or other information could be provided to various destinations 332a-332c. In this example, the destinations include an alerts console 332a denoting a device configured to present alerts or other information to users, a dependency graph 332b denoting a graphical display representing the dependencies of devices in a computing system or network, and a pulse indicator 332c presenting an indication of the number of events or situations detected. Of course, information from the fabric monitoring system 110 could be presented to any other or additional destinations or used in any other suitable manner.

In this example, a policy manager 334 allows users to self-manage the monitoring rules that are used by the monitoring platform 314 and the core platform 320. As examples, these rules can be used to identify events of interest, to group related events, to suppress events, and to identify situations related to the events. The rules defined using the policy manager 334 can be stored in a repository 336, such as a database or other storage and retrieval device or system.

The fabric monitoring system 110 is also able to retrieve data from at least one reference data service 338. The reference data service 338 could be used to provide any suitable reference data used by the fabric monitoring system 110. For instance, the reference data service 338 could be used to obtain information assisting with event classification and grouping and with situation identification. Each data service 338 includes any suitable structure for storing and facilitating retrieval of information.

Figure 4:
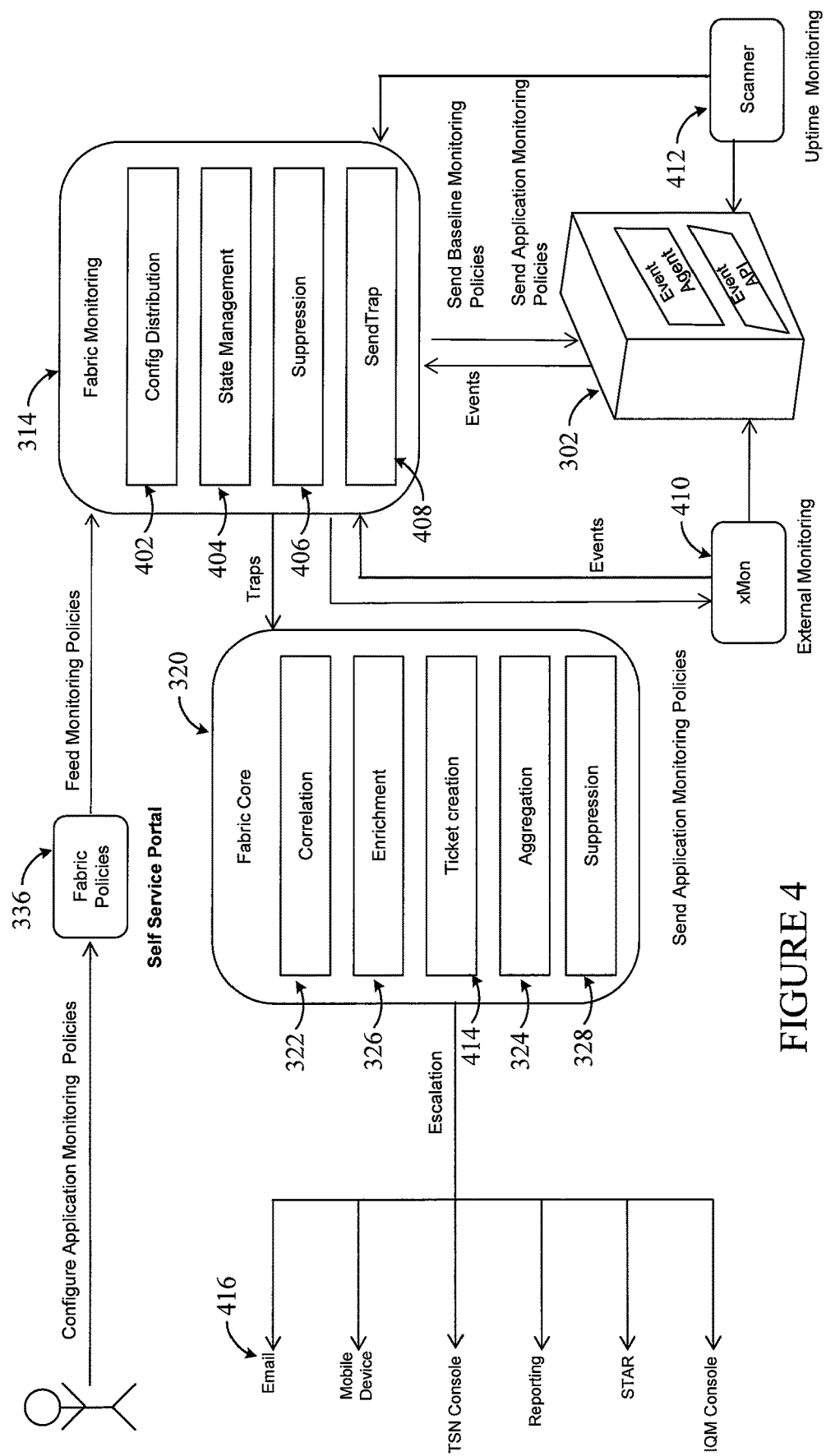

Additional details of the fabric monitoring system 110 are shown in FIG. 4. As shown in FIG. 4, a user (such as an application technical owner) can configure one or more policies, such as by using a self-service portal supported by the policy manager 334. The policies can be stored in the repository 336. The policies are made available to the monitoring platform 314, which uses the policies to (among other things) obtain events from the host 302 and other event sources. Multiple hosts could be executing one or more common enterprise applications deployed across an enterprise system.

In this example, the monitoring platform 314 supports a configuration distribution function 402, which is used to provide rules and threshold information from the received policies to distributed event agents in the hosts and other event sources. The monitoring platform 314 also supports a state management function 404, which is a pre-processing component that sits between the distributed event agents and the core platform 320 and that tracks state transitions and sends events based on the state transitions to the core platform 320. The monitoring platform 314 further supports a suppression function 406, which could be used to suppress certain events so that the events are not used to create situations. In addition, the monitoring platform 314 supports a "send trap" function, which could represent an agentless API used to send events directly to the core platform 320 from an application or other source.

The monitoring platform 314 sends event criteria and monitoring information, such as baseline monitoring policies and application monitoring policies, to the event agent 310 and receives events from the event agent 310. The received events are identified by the event agent 310 using the event criteria and monitoring information. The monitoring platform 314 may also be able to communicate with and receive events from external monitoring modules and functions 410 and enterprise scanning functions 412. The external monitoring modules and functions 410 can receive the event criteria and monitoring information from the monitoring platform 314 and use that information to identify events, while the enterprise scanning functions 412 may operate without such information. As can be seen here, the monitoring platform 314 is able to receive events from various sources as inputs. Since the event agents 310, external monitoring modules and functions 410, and enterprise scanning functions 412 can be distributed across an enterprise system, the monitoring platform 314 can receive events occurring in multiple locations and report the events through the system to provide visibility to actual enterprise performance.

Once events are received at the monitoring platform 314, the events (or at least the non-suppressed events) are forwarded to the core platform 320, where the events are evaluated according to the rules loaded from the policies. For example, the rules can be used to classify the events and determine which type of processing models will be used to monitor the streams of events arriving at the core platform 320. At least one processing model is therefore selected and used to determine when a situation should be created. Events can be marked as being suppressed after the classification, and the model(s) that evaluate the events can either ignore the suppression indication and process the suppressed events or use the suppression indication to ignore the suppressed events. The correlation and aggregation functions 322 and 324 can be driven by the rules and the models that the rules specify during the event classification.

One or more ticketing creation functions 414 are used in the core platform 320 here. Identified situations can be distributed to the ticketing creation functions 414 based on the rules loaded from the policies, which indicate which ticketing creation functions 414 are appropriate for which situations. Once events are processed within the core platform 320, the events or situations are made available for escalation to any number of additional destinations 416, such as terminals, processors, or users, for recording, analysis, corrective/preventive action, or other functions.

In some embodiments, the core platform 320 provides for clustering of related events into service-impacting situations. Such clustering allows for, in some examples, a 65% or more reduction in monitoring noise by clustering or grouping analytically similar events, excluding duplicate events, and identifying analytically-unique events.

Situations, as with events, may be further processed into multiple situation models, such as discovered and/or user-defined models. Due to the ticketing and event/situation recording functions of the fabric monitoring system 110, a transparent and full audit trail of all events and situations can be provided. Furthermore, the recordation, categorization, and auditing of events and situations provides the ability to analyze and identify trends, outliers, bogus situations, and other data associated with the events and situations.

Figure 5:
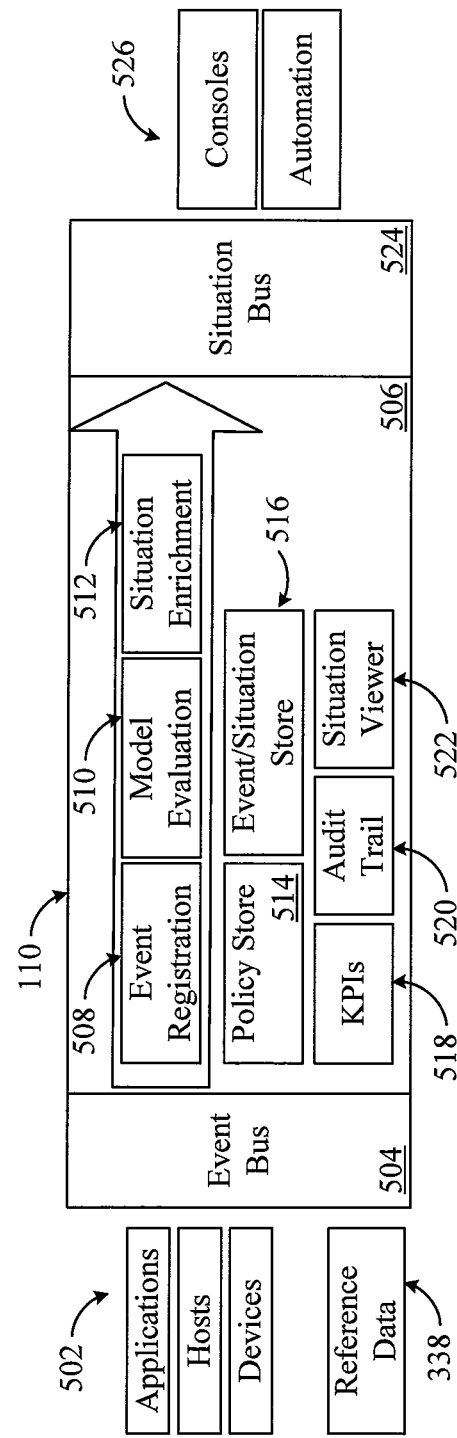

FIG. 5 illustrates additional details of how events can be processed within specific embodiments of the core platform 320. As shown in FIG. 5, various event sources 502 provide events to the fabric monitoring system 110. The event sources 502 include applications, host servers, and user devices that can provide events to the fabric monitoring system 110, such as through the use of event agents 310. The events are reported through an event bus 504, which could denote a queue or other structure configured to receive events. The event bus 504 could, for instance, be used in the monitoring platform 314 or the core platform 320.

An event processing system 504 includes an event registration module 508, a model evaluation module 510, and a situation enrichment module 512. The event registration module 508 can identify incoming events, assign unique identifiers to the events, and perform other operations related to the incoming events. The model evaluation module 510 processes the events to identify various situations associated with the events. The situation enrichment module 512 processes the identified situations and provides additional information about the identified situations.

These modules 508-512 draw data and information from an event policy store 514, an event/situation store 516, and a key process indicator (KPI) store 518. An audit trail and tracking module 520 and an event/situation viewer 522 or other user interface are also provided. The event policy store 514 denotes a storage in which various user-defined or other policies are stored, such as when policies are received from the repository 336. The event/situation store 516 stores information about received events and identified situations. The KPI store 518 provides information about measurements captured by the fabric monitoring system 110 and how the measurements are used. The audit trail and tracking module 520 tracks information about events and situations and stores the information, including information about the events and situations themselves and how the situations are resolved. The event/situation viewer 522 provides a user interface for interacting with the fabric monitoring system 110 and viewing results obtained by the fabric monitoring system 110.

The event processing system 504 provides grouped and categorized events defining situations into a situation bus 524, which could denote a queue or other structure configured to output the situations. The situations here are output to destinations 526, such as to consoles, devices, and messaging services for user acknowledgement and to servers and processors for automated processing.

The use of a fabric-based monitoring architecture in the system 110 to support complex event processing as shown here transitions away from enterprise system fault alerts, as found with previous enterprise monitoring capabilities. Instead, the fabric monitoring system 110 allows event/situational awareness across an enterprise system. In the example embodiments shown here, event classification includes self-service definitions of event processing though the use of a monitoring definition language (such as a DSL) and the separation or other categorization of streams of events into domains for isolation. Processing models within the fabric monitoring system 110 define how to process events into situations and how to handle individual events. Models may be defined in any manner as to best categorize anticipated events across the enterprise system. For example, models may process events into situations by frequency of event, type of event, location or local impact of event, or source of event (like outside influence on the enterprise system, such as hacking, unregistered use, unauthorized use, or multiple use by the same user). Analytical models may also be used to cluster events into situations with the same root cause, the same geographical location, or the same date/time occurrence.

In example embodiments, signals representing synthetic events can be generated by the fabric monitoring system 110 for a dependent asset based on a pluggable reference data source. For example, an event associated with a host going down could lead to the generation of a synthetic event for application deployment. Moreover, in example embodiments, the fabric monitoring system 110 provides for full transparency of processing, showing how and why events are grouped or processed into a situation or situations.

The use of the fabric monitoring system 110 is fully resilient, and the fabric monitoring system 110 can be scalable in multiple dimensions. For example, the number of computing nodes 112 used in the fabric monitoring system 110 can be adjusted based on load, and the number of instances of the fabric monitoring system 110 (the number of stripes) can also be adjusted based on load. In some instances, the fabric monitoring system 110 could handle up to one thousand events per minute or more. As a particular example, the fabric monitoring system 110 could (on average) receive about 2.8 million events, process about 1.7 million events (the remainder being suppressed), and identify about 130,000 situations per day for a specific installation.

In some embodiments, the fabric monitoring system 110 could support a pluggable messaging architecture, such as through the use of any JAVA MESSAGE SERVICE (JMS) compliant messaging. The fabric monitoring system 110 can also support event and service enrichment via one or more reference data sources, and embedded event correlations can be made via discovered and modeled analytical methods. The fabric monitoring system 110 could be easily pluggable to external automation frameworks, support event suppression and submission APIs, and support event policy definitions via a self-defined DSL. The fabric monitoring system 110 can provide the ability to build custom situation models, the ability to trace events and situations, and provide a framework that is agent-agnostic.

Figure 6:
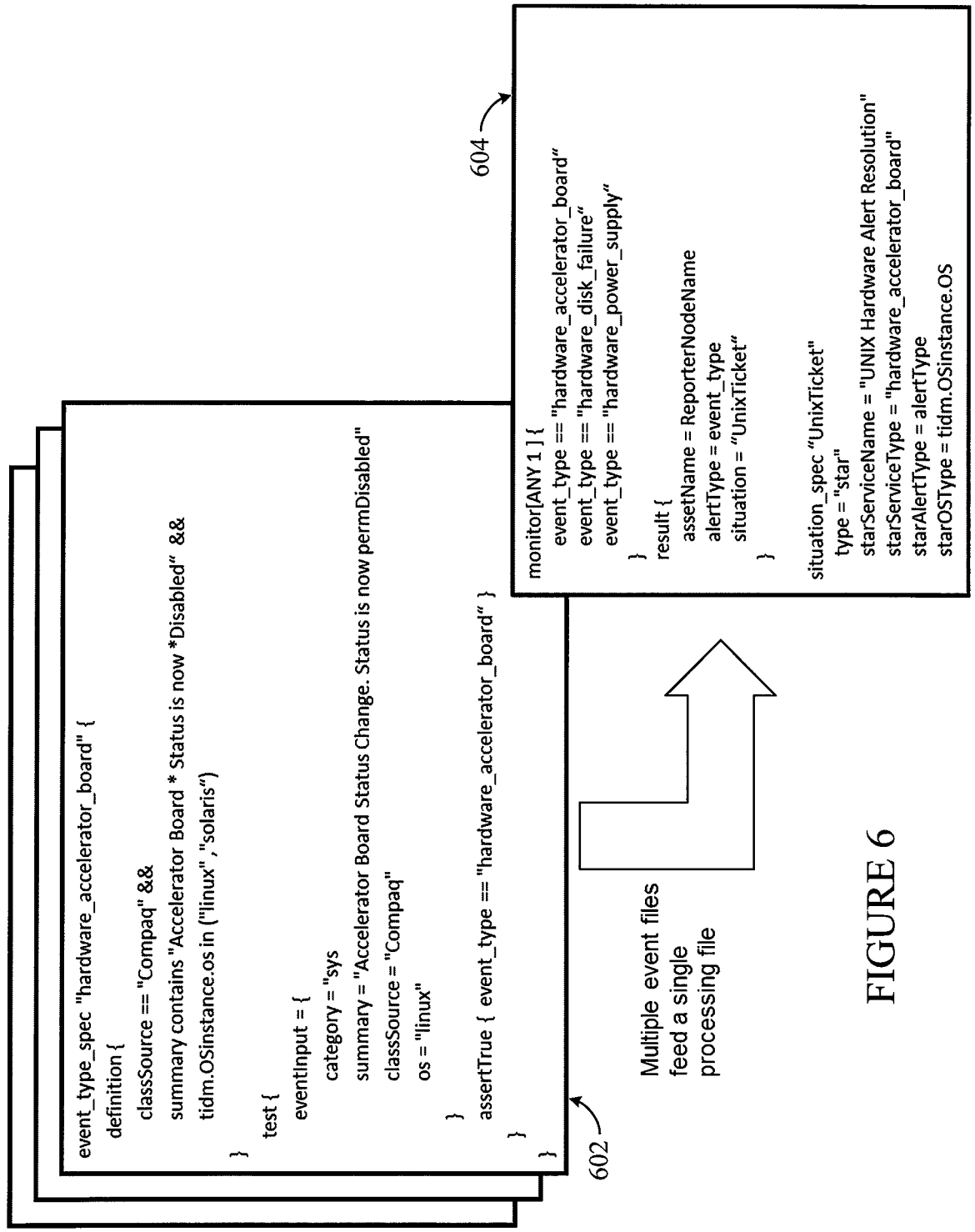

An example use of a monitoring definition language is shown in FIG. 6. A domain specific language allows users to self-describe events and how to process the events. This information can be provided to the policy manager 334 and stored as policies in the repository 336. As shown in FIG. 6, a user can define multiple event files 602, each of which defines one or more types of events. The user can also combine multiple event files 602 into a single processing model file 604, which can be used to identify the occurrence of a situation. This type of functionality can be used by any number of users to define events of interest and to define how those events are grouped into situations.

The use of a monitoring definition language allows teams of personnel to more easily manage the monitoring performed by the fabric monitoring system 110. It also provides for improved transparency as to how events are being processed, as well as the coverage and usage of the fabric monitoring system 110. In addition, the use of a monitoring definition language can provide for controls around publishing changes and releasing changes for rules.

In some embodiments, the monitoring definition language can be used to define packages containing definitions of events, how monitoring for those events occurs, and how situations are identified as a result of the monitoring. The following represents one example of a package that can be defined using a monitoring definition language.

```
package {
    //scope - populate the appdir entities for the events of interest
        "did" : [ ],
        "app": ["15075"],
        "fam" : [ ],
        "subbu" : [ ],
        "bu" : [ ],
    //routing - default escalations
        "rota" : ["gs-my-app-support"]
}
event_set "CapacityMgmt" {
    rule "HighCPU" = "CPU.Busy(threshold:95,operator:>,frequency:60)"
    rule "HighMemory" = "Memory.Used(threshold:95,operator:>,frequency:60)"
    rule "HighDisk" =
"Filesystem.Used(target:All,threshold:95,operator>,frequency:60)"
}
event_set "AppAvailable" {
    rule "ProcessUp" = Process.Count(threshold:1,operator:=,frequency:60)
    rule "UIResponse" =
URL.ResponseStatus(threshold:200,URL="home.web.gs.com",frequency:60)
        subscribe = ["host_unreachable","db_temp_full","DB_MAX_CONN",
"DB_HOME_FS"]
}
monitor "MyCapacityMgmt" {
        processing = [ type = "OneForOne", count = "1", aggregated = "true" ]
//processing = [ type = "XOverTimeY" , count = "5", time = "200" ]
        event_set_ref = [ "CapacityMgmt" ]
        situation_ref = ["MC_Rota"]
        filter = [ "environment" == "prod" ]
        enrichment = [ "myTag" = "myvalue" ]
}
situation "MC_Rota" {
        Rota = [ "inform_rota" ]
        iconclude = [ flowId = "1234567" ]
}
```

Various functions within the fabric monitoring system 110 enable various benefits to be obtained. For example, it is possible to integrate the fabric monitoring system 110 with incident management and automation platforms and provide system development life-cycle (SDLC) support and controls for monitoring policies. It is also possible to use the fabric monitoring system 110 to provide visibility into production and operational situations across business units and to isolate event streams by multiple stripes. A stripe can be defined as a set of events associated with a region or business unit that is processed by a separate instance of the fabric monitoring system 110. A stripe can have its own instances of messaging, persistence, and processing with separate service instances. The operation of one stripe can be independent of other stripes, and communication between stripes for cross-stripe correlations can occur through synthetic events.

Note that each of the platforms, functions, and modules described above could be implemented using any suitable hardware or a combination of hardware and software/firmware instructions. In particular embodiments, each of the platforms, functions, and modules includes software instructions executed by one or more processing devices. Multiple processing devices could execute multiple instances of the platforms, functions, and modules, and the processing devices could be distributed across any number of nodes of a fabric computing system.

Although FIGS. 3 through 6 illustrate one example of a fabric monitoring system 110 for handling events involving computing systems and networks and related details, various changes may be made to FIGS. 3 through 6. For example, the functional divisions shown in FIGS. 3 through 6 are for illustration only. Various components in FIGS. 3 through 6 could be combined, further subdivided, rearranged, or omitted and additional components could be added according to particular needs.

Figure 7:
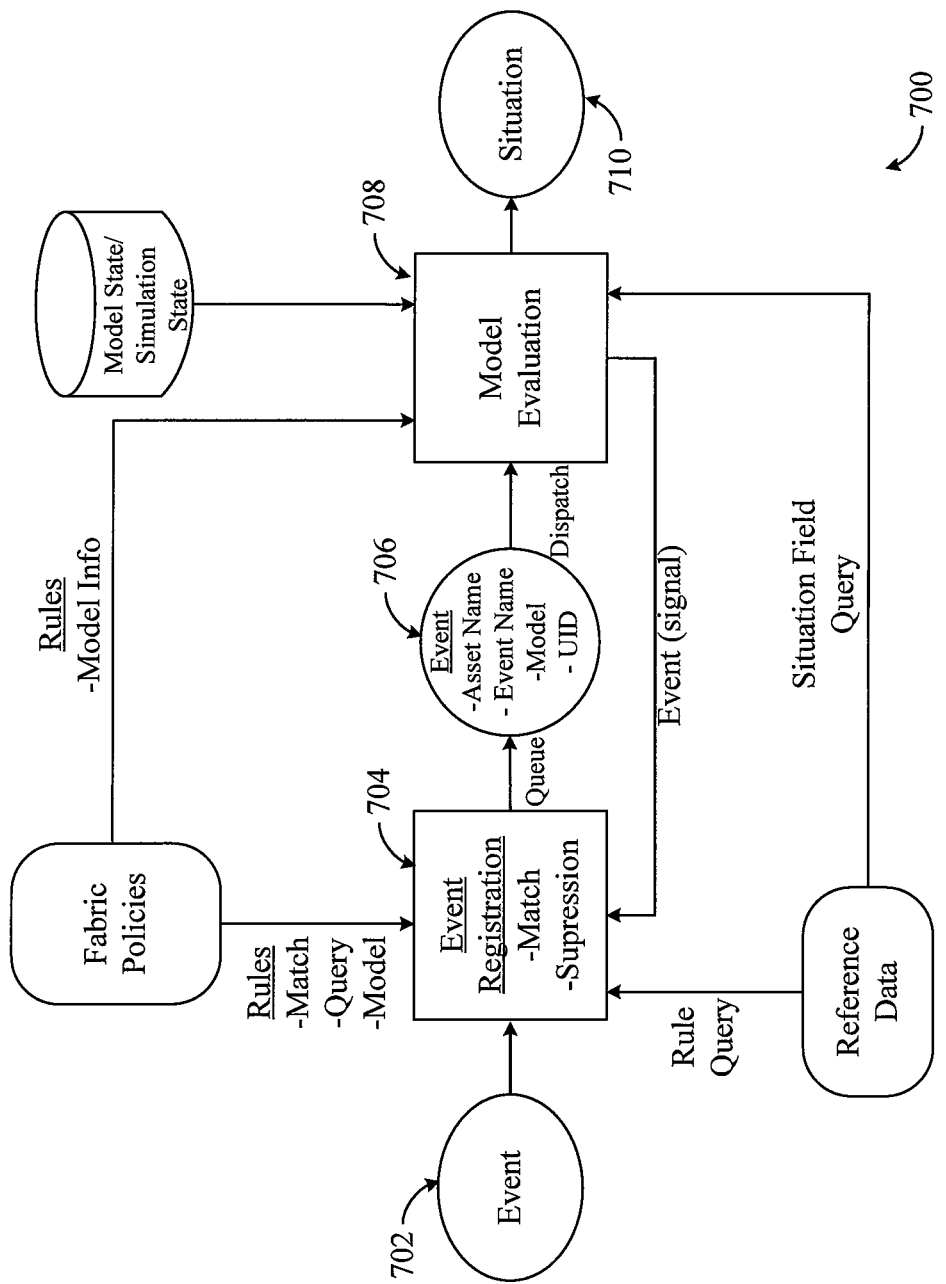
FIGS. 7 and 8 illustrate example process flows in a system for handling events involving computing systems and networks using a fabric monitoring system according to this disclosure.
Figure 8:
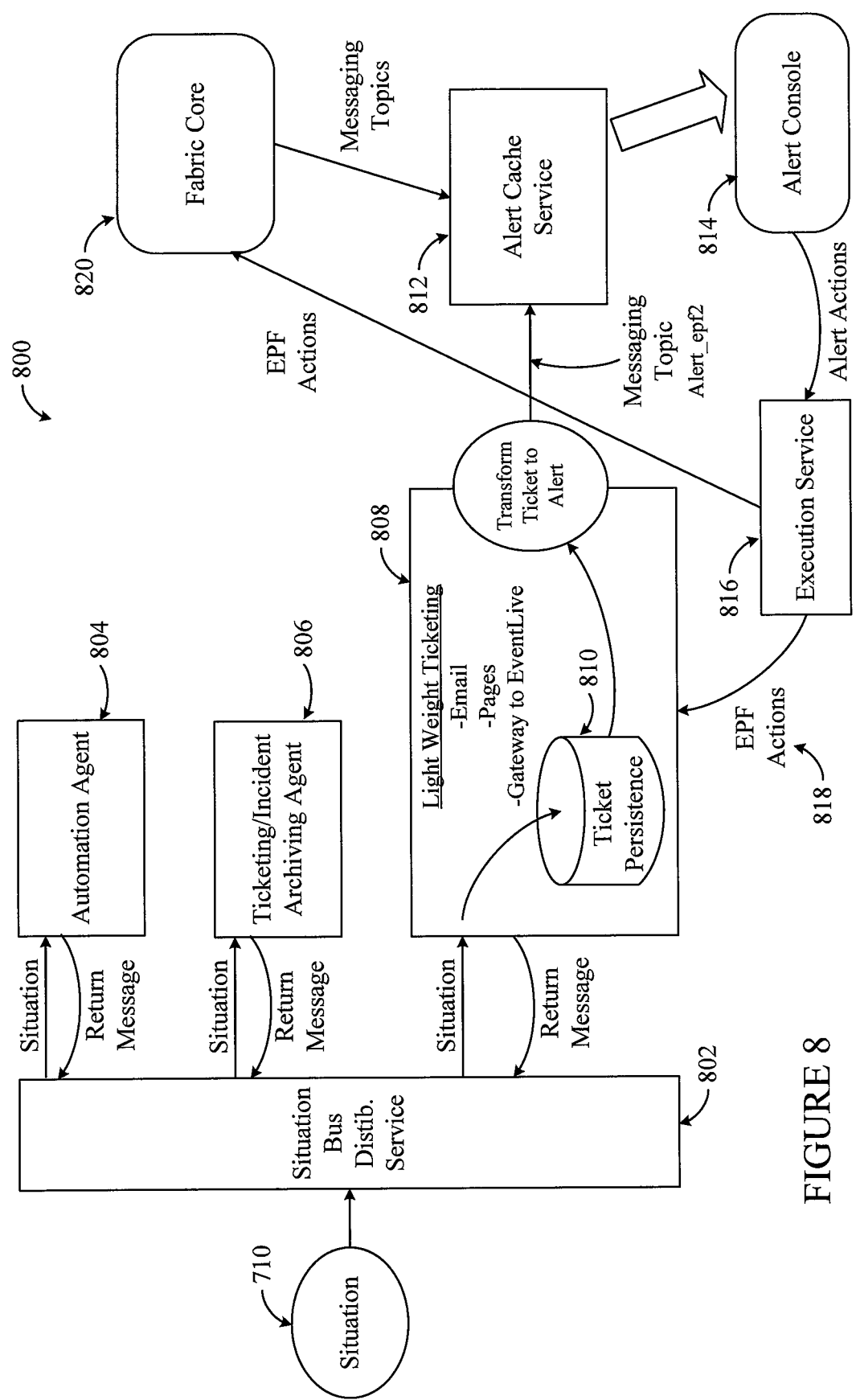

FIGS. 7 and 8 illustrate example process flows in a system for handling events involving computing systems and networks using a fabric monitoring system and related details according to this disclosure. In particular, FIG. 7 illustrates an example process flow 700 for handling events to identify situations, while FIG. 8 illustrates an example process flow 800 for handling identified situations. Note that while FIGS. 7 and 8 are described with respect to the fabric monitoring system 110 of FIG. 1 having the implementation as shown in FIGS. 3 through 6, the process flows 700 and 800 could be used with any suitable fabric monitoring system and in any suitable system.

As shown in FIG. 7, an event occurs within an enterprise system and is provided to a fabric monitoring system at step 702. This could include, for example, an event agent 310 identifying an event in a host 302 or other event source 502 and providing the event to the monitoring platform 314 or the event bus 504.

The event is registered at step 704. This could include, for example, the monitoring platform 314 or the event registration module 508 of the event processing system 504 identifying the incoming event and performing various actions using the event. Event registration occurs here using various data. For instance, the event registration can be based on rules obtained from one or more fabric monitoring policies, such as self-service rules for matching events to domains of interest and for matching individual events to specific event types (such as predefined types or derived types). Reference data may also provide rule queries or other event categorization to assist with event registration. During event registration, events can be matched to patterns and values specified in the policies. After an event has been matched with a rule, the event can be checked to see if the event matches any suppression criteria loaded from the policies system. If it does, the event can be annotated as being within a suppression interval so that one or more processing models can take that into account. During event registration, the event can be assigned an asset name, an event name, a processing model type, and (if it has not been pre-assigned) an event unique identifier (UID).

The event is dispatched at step 706 for evaluation at step 708. This could include, for example, the core platform 320 or the model evaluation module 510 of the event processing system 504 evaluating the event to identify if any situation is indicated by the event. The core platform 320 or model evaluation module 510 can receive various inputs to process an event stream, such as multiple inputs for each asset name, into situations. The inputs to the core platform 320 or model evaluation module 510 could include fabric policy rules and other model information, model and situation state information, and enterprise reference data. The core platform 320 or model evaluation module 510 processes the event as the latest in a stream of events potentially forming a situation. In some embodiments, the creation of a situation may by itself define an event.

Any identified situation is output at step 710. This could include, for example, the core platform 320 or the model evaluation module 510 of the event processing system 504 outputting the identified situation and any related information.

As shown in FIG. 8, once a situation is identified from a stream of events and according to applicable fabric policies, the situation is output and enters a situation bus distribution service at step 802. From the service bus 524, the situation can be dispatched to various devices or systems, such as various event/situation ticketing systems, depending on the situation. For example, if automated resolution of a situation is possible or permitted, the situation can be dispatched to an automation agent at step 804. The automation agent could denote an application or other logic that performs some function or functions to automatically resolve a given situation. If automated resolution of a situation is not possible or permitted and a specific ticketing system is identified or associated with the situation, the situation can be dispatched to a ticketing and incident agent at step 806. The ticketing and incident agent can then generate tickets or other notifications in accordance with the specifics of that ticketing and incident system. The ticketing and incident agent can return a reference identifier for the situation and an indication that the situation should be closed.

If no ticketing and incident agent is identified, a situation can be provided to a lightweight ticketing agent at step 808. The lightweight ticketing agent includes a ticket persistence database that supports situation storage at step 810 and receives input from one or more execution services. The lightweight ticketing agent transforms the ticket to an alert, serves as a bridge to live intervention of the situation, and generates e-mails, message notifications, or other notifications to relevant users or stakeholders. In this example, the lightweight ticketing agent can provide one or more messaging topics (such as alerts) to an alert caching service at step 812, which can notify one or more users of the alerts via at least one console at step 814. Using the console(s), the user(s) can identify various alert actions to be performed for each alert, such as assigning or closing the alert. The alert actions are provided to one or more execution services at step 816, which can take steps to implement the selected alert actions. For instance, the execution services can issue "event processing fabric" (EPF) actions to be implemented by the lightweight ticketing agent at step 818 and/or by another fabric computing core at step 820.

Although FIGS. 7 and 8 illustrate examples of process flows 700 and 800 in a system for handling events involving computing systems and networks using a fabric monitoring system and related details, various changes may be made to FIGS. 7 and 8. For example, various steps in each figure could overlap, occur in parallel, occur in a different order, or occur any number of times. Also, the process flows shown here can vary depending on how events are identified and converted into situations and how situations are handled in particular fabric monitoring systems.

The use of the fabric monitoring system 110 as described above for monitoring, diagnosing, and maintaining computing systems or networks 102a-102n provides technical solutions to technical problems in the field of computer and network management. As noted above, events handled by the fabric monitoring system 110 can relate to current states or changes in the current states of devices, systems, or networks, as well as anomalies or occurrences of defined conditions, within the computing systems or networks 102a-102n. For large enterprise systems, the number of events can be massive, sometimes numbering in the thousands per minute. This makes it extremely difficult or impossible for personnel to manually review and resolve the events and to identify related events that may be indicative of more serious security breaches or other problems in the computing systems or networks 102a-102n.

The fabric monitoring system 110 supports the automated identification of events, as well as the automated classification of events and the identification of situations from related events. This makes it much easier to manage the events, identify situations to be resolved, and possibly even resolve the situations automatically. Among other things, this can help to keep the computing systems or networks 102a-102n functioning more smoothly and to resolve issues that do arise. Moreover, as noted above, this can be done in a customizable manner, such as by defining events, how monitoring for the events occurs, and how the events are used to identify situations. This provides great flexibility in the use of the fabric monitoring system 110. Other technical features have also been provided above.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   receiving, at multiple stripes, information identifying occurrences of first events in an enterprise system comprising multiple computing or networking systems, the first events occurring on or involving computing or networking devices in the computing or networking systems, the stripes comprising different instances of a fabric monitoring system that includes a plurality of computing nodes interconnected by a plurality of communication links;
   processing, using the multiple stripes, the information in real-time to identify the occurrences of the first events and to assign the first events to multiple situations, the first events identified using rules accessible by the stripes, the first events assigned to the situations using one or more processing models accessible by the stripes;
   transmitting second events between the stripes to support cross-stripe correlations of the first events or the situations, the second events comprising synthetic events; and
   outputting information identifying the situations.

2. The method of claim 1, wherein:
   a number of the computing nodes operating in each instance of the fabric monitoring system is scalable; and
   a number of the stripes in the multiple stripes is scalable.

3. The method of claim 1, further comprising:
   storing information associated with the first events and the situations, including information about the first events and the situations and information about how the situations are resolved, to provide an audit trail for the first events and the situations.

4. The method of claim 1, further comprising:
   obtaining the rules from one or more policies, at least a portion of the one or more policies defined by at least one user using a monitoring definition language.

5. The method of claim 1, wherein the one or more processing models define how to categorize the first events and identify the situations, the one or more processing models including:
   at least one user-defined model defined by at least one user; and
   at least one analytical model defining one or more analytical functions that operate using the information identifying the occurrences of the first events.

6. The method of claim 1, further comprising:
   responsive to identification of the situations, creating the synthetic events, wherein each stripe of the multiple stripes operates independently.

7. The method of claim 1, wherein different ones of the multiple stripes process different first events that are associated with at least one of:
   different assets in the computing or networking systems;
   different locations in which the computing or networking systems are deployed;
   different deployments of hardware, software, or firmware in the computing or networking systems;
   different business units using the computing or networking systems; and
   different types of business being transacted using the computing or networking systems.

8. The method of claim 1, wherein the first events comprise at least one of:
   current states of the computing or networking devices in the computing or networking systems;
   changes in the current states of the computing or networking devices in the computing or networking systems;
   anomalies in the computing or networking devices in the computing or networking systems; and
   occurrences of defined conditions within the computing or networking systems.

9. The method of claim 1, wherein outputting the information identifying the situations comprises:
   providing information identifying at least one of the situations to an automated agent that automatically resolves the at least one situation.

10. The method of claim 1, wherein outputting the information identifying the situations comprises:
    providing information identifying at least one of the situations to a ticketing agent that generates at least one notification for personnel, the at least one notification identifying the at least one situation.

11. A system comprising:
    multiple stripes, the stripes comprising different instances of a fabric monitoring system that includes multiple computing nodes and multiple communication links coupling the computing nodes, at least one of the computing nodes comprising one or more processors, the stripes configured to:
    receive information identifying occurrences of first events in an enterprise system comprising multiple computing or networking systems, the first events occurring on or involving computing or networking devices in the computing or networking systems;

process the information in real-time to identify the occurrences of the first events and to assign the first events to multiple situations, the first events identified using rules accessible by the stripes, the first events assigned to the situations using one or more processing models accessible by the stripes;

generate and transmit second events to one another in order to support cross-stripe correlations of the first events or the situations, the second events comprising synthetic events; and output information identifying the situations.

12. The system of claim 11, wherein:

a number of the computing nodes operating in each instance of the fabric monitoring system is scalable; and a number of the stripes in the multiple stripes is scalable.

13. The system of claim 11, wherein the stripes are further configured to store information associated with the first events and the situations, including information about the first events and the situations and information about how the situations are resolved, to provide an audit trail for the first events and the situations.

14. The system of claim 11, further comprising:

a repository configured to store one or more policies comprising the rules, at least a portion of the one or more policies defined by at least one user using a monitoring definition language.

15. The system of claim 11, wherein the one or more processing models define how to categorize the first events and identify the situations, the one or more processing models including:

at least one user-defined model defined by at least one user; and at least one analytical model defining one or more analytical functions that operate using the information identifying the occurrences of the first events.

16. The system of claim 11, wherein the stripes are further configured to:

responsive to identification of the situations, create the synthetic events, wherein each stripe of the multiple stripes operates independently.

17. The system of claim 11, wherein each stripe is configured to generate at least some of the synthetic events upon identification of situations by that stripe.

18. The system of claim 11, wherein different ones of the multiple stripes are configured to process different first events that are associated with at least one of:

different assets in the computing or networking systems;

different locations in which the computing or networking systems are deployed;

different deployments of hardware, software, or firmware in the computing or networking systems;

different business units using the computing or networking systems; and different types of business being transacted using the computing or networking systems.

19. The system of claim 11, wherein the first events comprise at least one of:

current states of the computing or networking devices in the computing or networking systems;

changes in the current states of the computing or networking devices in the computing or networking systems;

anomalies in the computing or networking devices in the computing or networking systems; and occurrences of defined conditions within the computing or networking systems.

20. The system of claim 11, wherein the stripes are configured to output the information identifying the situations by providing information identifying at least one of the situations to an automated agent that automatically resolves the at least one situation.

21. The system of claim 11, wherein the stripes are configured to output the information identifying the situations by providing information identifying at least one of the situations to a ticketing agent that generates at least one notification for personnel, the at least one notification identifying the at least one situation.

22. A non-transitory computer readable medium containing computer readable program code that, when executed by multiple stripes comprising different instances of a fabric monitoring system that includes a plurality of computing nodes interconnected by a plurality of communication links, cause the stripes to:

receive information identifying occurrences of first events in an enterprise system comprising multiple computing or networking systems, the first events occurring on or involving computing or networking devices in the computing or networking systems;

process the information in real-time to identify the occurrences of the first events and to assign the first events to multiple situations, the first events identified using rules accessible by the stripes, the first events assigned to the situations using one or more processing models accessible by the stripes;

generate and transmit second events to one another in order to support cross-stripe correlations of the first events or the situations, the second events comprising synthetic events; and output information identifying the situations.

* * * * *